United States Patent [19]

Yabe et al.

[11] Patent Number: 4,809,078
[45] Date of Patent: Feb. 28, 1989

[54] LIQUID CRYSTAL TELEVISION RECEIVER

[75] Inventors: Nobol Yabe; Kazumasa Hirata; Shuri Mori; Ken Yamauchi, all of Tokyo, Japan

[73] Assignee: Casio Computer Co., Ltd., Tokyo, Japan

[21] Appl. No.: 555,509

[22] Filed: Sep. 27, 1984

[30] Foreign Application Priority Data

Oct. 5, 1983 [JP]  Japan ............................. 58-154741[U]
Nov. 30, 1983 [JP]  Japan ............................. 58-184864[U]
Nov. 30, 1983 [JP]  Japan ................................. 58-184865

[51] Int. Cl.$^4$ .......................... H04N 5/74; H04N 5/70
[52] U.S. Cl. .................................... 358/236; 358/241; 340/781; 340/784; 350/345
[58] Field of Search ................... 358/56, 59, 189, 230, 358/236, 239, 240, 241; 362/84, 135; 340/781, 784; 350/345; 36/705; 273/1 GC

[56] References Cited

U.S. PATENT DOCUMENTS

| 3,840,695 | 10/1974 | Fischer | 358/61 |
| 4,403,216 | 9/1983 | Yokoi | 350/345 |
| 4,561,044 | 12/1985 | Ogura et al. | 358/236 |
| 4,562,478 | 12/1985 | Hirasawa et al. | 358/236 |
| 4,568,080 | 2/1986 | Yokoi | 340/781 |

FOREIGN PATENT DOCUMENTS

| 1547598 | 6/1979 | United Kingdom . |
| 2089549 | 6/1982 | United Kingdom . |
| 2116805 | 9/1983 | United Kingdom . |
| 2124816 | 2/1984 | United Kingdom . |
| 2153620 | 8/1985 | United Kingdom | 358/230 |

*Primary Examiner*—James J. Groody
*Assistant Examiner*—John K. Peng
*Attorney, Agent, or Firm*—Frishauf, Holtz, Goodman & Woodward

[57] ABSTRACT

A liquid crystal television receiver has a main frame including a reflecting plate and a hood member with a liquid crystal display panel and an electroluminescence panel. The reflecting plate is disposed so as to slant with respect to the liquid crystal display panel, and provides a display of a picture from the display panel in a reflecting manner. The electroluminescence panel is slidably provided in the hood member. For illuminating the liquid crystal display panel, the electroluminescence panel is slid above the liquid crystal display panel.

23 Claims, 14 Drawing Sheets

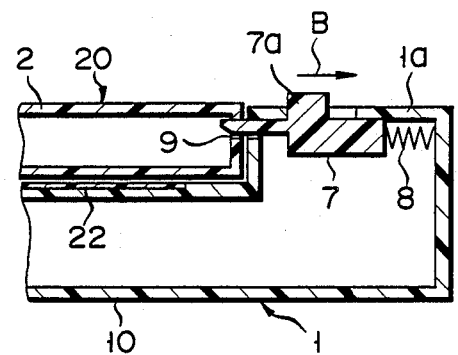
F I G. 4
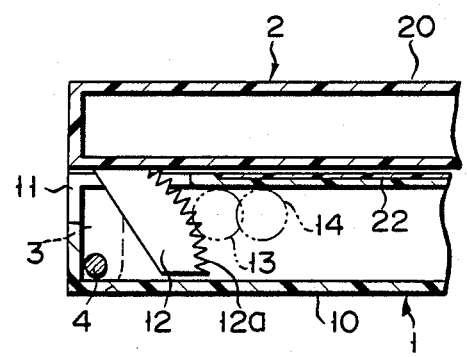
F I G. 5A
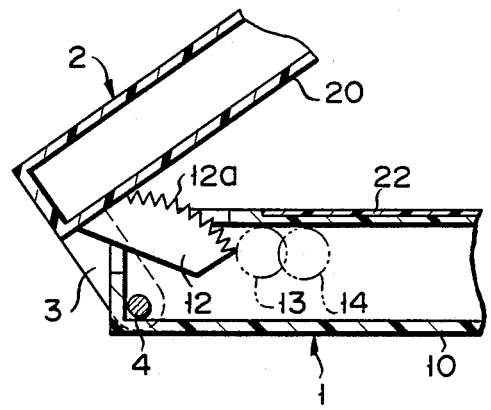
F I G. 5B

LIQUID CRYSTAL TELEVISION RECEIVER

BACKGROUND OF THE INVENTION

The present invention relates to improvements on a television receiver (TV set) of the type in which a picture is displayed using a liquid crystal display panel.

One of the known liquid crystal display devices employs, for display of a reproduced picture, a liquid crystal display panel with a reflecting plate on the reverse side, as shown in FIG. 1 and disclosed in U.S. Pat. No. 4,403,216. The display panel is able to display a picture in a bright place, but unable to display it in a dark place. The display panel uses the same surface for both incident light and picture display purposes. This structural feature makes it difficult to see a displayed picture. To cope with this problem, another type of liquid crystal display device, as illustrated in FIG. 3 and disclosed in U.S. Pat. No. 4,403,216, was developed. In this display device, a picture on a transparent liquid crystal display panel is projected onto a reflecting plate disposed so as to slant with respect to the liquid crystal display panel. Lights, containing picture information emitted from the display panel, are reflected by the reflecting panel for providing a visual presentation of the reproduced picture to a viewer. Structurally, a housing houses both the display panel and the reflecting plate, thus eliminating the difficult-to-see problem due to the reflection. A spot light, as a light source, illuminates the display panel to solve the problem that the picture displayed can not be seen in a dark place.

However, the spot light illumination method nonuniformly illuminates the display panel. Then, the picture on the reflection plate is uneven in brightness. Inevitably, the picture displayed in a dark place has an uneven brightness. The spot light illummination method, when applied for a transparent liquid crystal display panel of the dot matrix type, remarkably deteriorates the contrast of the picture displayed on the display panel. The reason for this is that this type of the display panel is used at a high duty cycle. For displaying a motion picture, a satisfactory brightness and a high contrast are required. Therefore, the spot light illumination method provides only a poor picture. In this respect, it was very difficult to apply the liquid crystal display device to a TV set. This is also true for color TV application. The color TV requires higher brightness and contrast. Nevertheless, increased loss of light due to light absorption by color filters rejects heightening of the contrast, which is for obtaining a satisfactory tone on the picture displayed.

SUMMARY OF THE INVENTION

Accordingly, an object of the present invention is to provide a liquid crystal televison receiver with a good picture quality.

According to the present invention, there is provided a liquid crystal television receiver comprising: a reflecting member for reflecting the applied light; a hood member for covering the upper portion of the reflecting member, a transparent liquid crystal display panel of the dot matrix type, which is provided in the hood member, slants with respect to the reflecting member, and projects an image on the reflecting member; a planar illuminating member for illuminating the liquid crystal display panel and holding means, which is provided in the hood member, and is capable of holding the illuminating member at a predetermined location above the surface of the liquid crystal display panel, the surface being opposite to the surface of the illuminating member facing the reflecting member.

With such an arrangement, in a place with sufficient external light, the light is used for displaying a reproduced picture. In a place with insufficient external light, the planar illumination member is placed above the liquid crystal display panel to illuminate the display panel for the picture display purposes. The planar shape of the illumination member ensures a uniform illumination on the display panel. Therefore, even in a dark place, the picture displayed is uniform in brightness. Further, a high contrast is ensured even when it is of the dot matrix type. Use of external light in a bright place saves electric power consumed by the illumination member.

BRIEF DESCRIPTION OF THE DRAWINGS

FIG. 4 shows a cross sectional view of a part of the TV set of FIG. 1 for illustrating a lock mechanism of the TV set;

FIG. 5A shows a cross sectional view of a part of a closed state of the TV set of FIG. 1 for illustrating a breaking mechanism thereof;

FIG. 5B shows a cross sectional view of a part of an opened state of the TV set of FIG. 1 for illustrating a breaking mechanism thereof;

DETAILED DESCRIPTION OF THE PREFERRED EMBODIMENTS

A structural arrangement of a liquid crystal television set, which is an embodiment of the present invention, will be described in detail referring to FIGS. 1 to 9.

Figure 3:
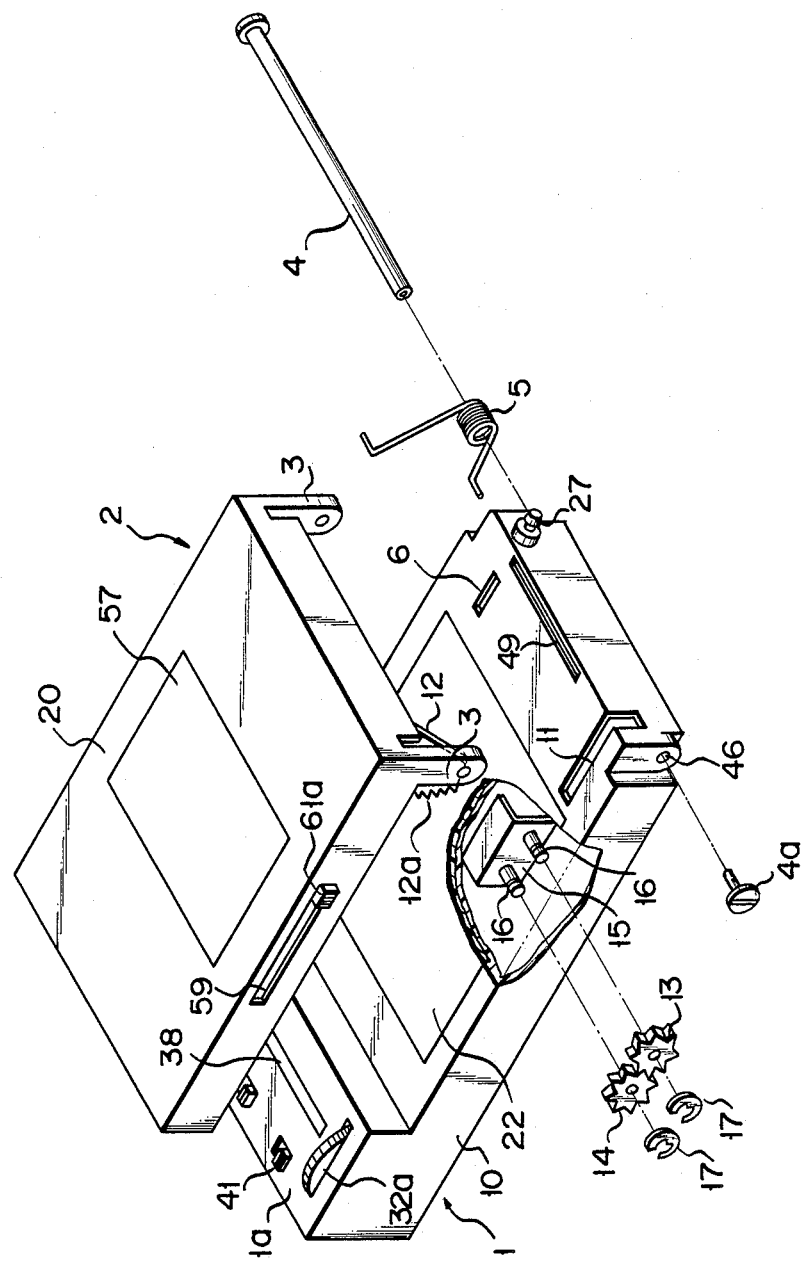
FIG. 3 shows an exploded view of the TV set of FIG. 1 for illustrating a structure thereof, a part thereof being broken.

As shown, the television set comprises a thin box like main frame 1 and a hood 2 likewise configured. A hood case 20 (a case of the hood 2) has a couple of hinges 3 on both sides of the rear end portion. A shaft 4 passes through the hinges 3 and the rear end portion of a main frame case 10 (a case of the main frame 1). The other end of the shaft 4 is stopped by a stopper screw 4a. The hood 2 is swung about the shaft 4, in the direction of arrow A, for opening and closing. For opening the hood 2, the hood 2 is raised from a position where the hood 2 overlays the upper surface of the main frame 1 up to a position where the hood 2 is opened at a predetermined angle from the upper surface of the main frame 1, as shown. For closing, the hood 2 is turned down toward the main frame 1. The hood 2 automatically is opened by means of a push-up spring (a torsion spring) 5. The spring 5 which is supported by the shaft 4 is supported at one end by the inner surface of the main frame case 10. The other end of the spring 5 is resiliently set to the main frame case 10 from its lower side through an elongated hole 6. A lock mechanism locks the hood 2 when it is closed to overlay the upper surface of the main frame 1. The lock mechanism, as well illustrated in FIG. 4, comprises a lock member 7, slidably provided in an operating board section 1a of the main frame 1, and a coiled spring 8, set so as to push the lock member 7. The lock member 7 is pushed by the coiled spring 8 and inserted into a lock hole 9 formed in the front side of the hood case 20. For unlocking the hood 2, a knob 7a, formed on the upper surface of the lock member 7, is slid in the direction of arrow B shown in FIG. 4. After being unlocked, the hood 2 is raised by the torsion spring 5 to automatically open. The opening speed of the hood 2 is controlled so as to prevent an abrupt and rapid raise of the hood 2 due to the action of the torsion spring 5. Accordingly, the hood 2 is gently opened to protect a liquid crystal display panel (to be described later) from being damaged by mechanical shock. A mechanism for braking the hood 2 in its opening comprises a brake plate 12 and a pair of brake gears 13 and 14, as shown in FIGS. 3, 5A and 5B. FIG. 5A, shows a closed state of the hood 2, and FIG. 5B shows an opening state of the hood 2. The brake plate 12 having an arcuate teeth section 12a is provided at the rear side corner of the hood case 20, as shown. It is inserted into the main frame case 10 through an elongated hole 11 of the main frame case 10 when the hood case 20 is coupled with the main frame case 10. The pair of brake gears 13 and 14 are provided in the main frame case 10 while meshing with each other. The brake plate 12 meshes with the brake gear 13 at the arcuate teeth section 12a. To enhance the braking effect, grease is applied to the meshing portion of the pair of brake gears 13 and 14. The gears 13 and 14 are respectively fitted around fixed shafts 16 mounted to a supporting member 15 provided in the main frame case 10. E-rings 17 respectively prevent the gears 13 and 14 from slipping out of the fixed shafts. The braking mechanism also prevents the hood 2 from being abruptly closed.

Figure 6:
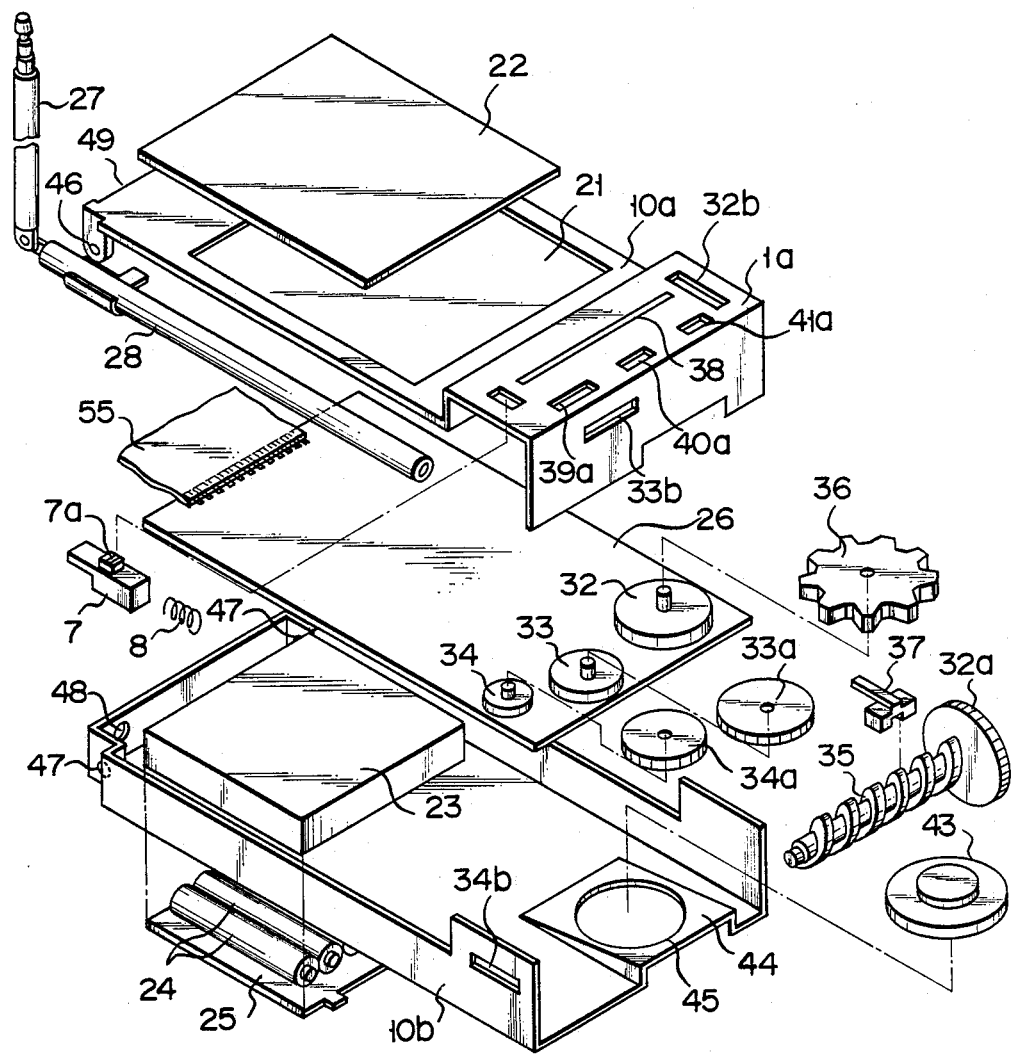
FIG. 6 shows an exploded view of the TV set of FIG. 1 for illsutrating a main frame thereof.

FIG. 6 illustrates the main frame 1 in an exploded manner. The main frame case 10 is a combination of an upper case 10a and a lower case 10b, which are configured as shown. A shallow and rectangular depression 21 is formed in the upper surface of the portion of the main frame case 10 to be overlaid by the hood 2, excluding its operating board section 1a. A rectangular plate 22 with a reflecting surface, which is made of a glass plate vapor-deposited over with silver, for example, is placed into the depression 21. A surface-coated mirror, which has a reflecting film on the surface of it, is preferably used for the reflection plate 22. The television set is designed so as to display a picture by reflecting a picture appearing on a liquid crystal display panel 51.

Figure 1:
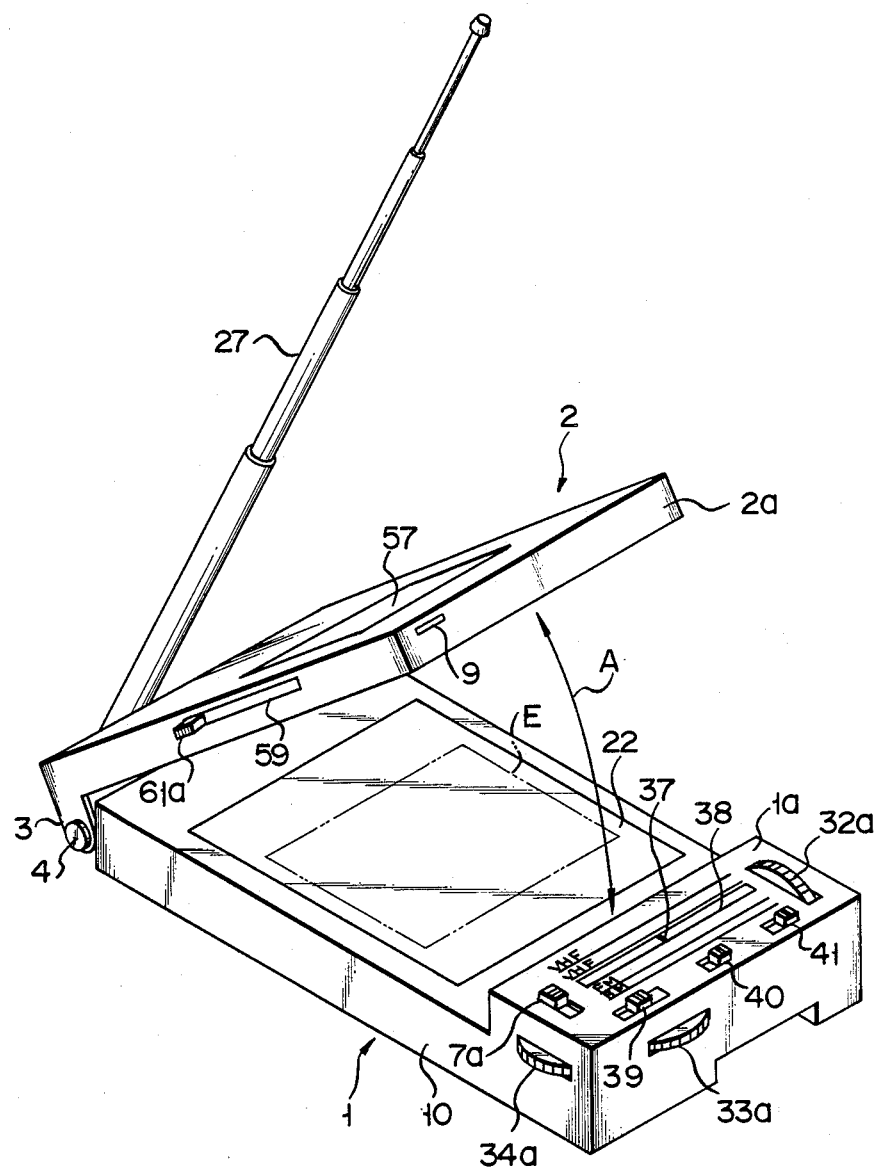
FIG. 1 shows a perspective view of a liquid crystal television receiver which is an embodiment of the present ivention.

Therefore, if a reverse surface coated mirror is used for the reflection plate 22, the picture suffers from the ghost effect (double imaged picture). The material of the reflection plate 22 is not limited to glass, but may be a synthetic resin plate or film if it is satisfactorily strong. A battery box 23 is formed on the bottom surface of the rear side of the lower case 10b. The battery box 23 is opened at the lower surface by opening the cover 25. A circuit board 26 is mounted in the main frame case 10. The circuit board 26 is connected to a rod antenna 27 for receiving television and radio waves. The rod antenna 27 is held in an antenna holder 28 when the TV set is not used. In operating the TV set, antenna 27 is pulled out from the antenna holder 28. The antenna holder 28 is inserted between one of the sides of the lower case 10b and the battery box 23 through a hole 48 for guiding the rod antenna 27. The antena holder 28 is mounted to the lower surface of the upper case 10a. A tuner 29, LSIs 30, an amplifying transistor 31, etc., are mounted on the lower surface of the circuit board 26, except the portion facing the battery box 23. Mounted on the upper surface of the predetermined portion of the circuit board 26, which correspond to the operating board section 1a, are a tuning dial 32, a voice volume dial 33 and a brightness volume dial 34 for adjusting the brightness of a picture displayed. Knobs 32a, 33a and 34a of the tuning dial 32, the audio volume dial 33 and the bright volume dial 34 are projected outside the upper and lower cases 10a and 10b, through openings 32b, 33b and 34b of the cases. The tuning dial 32 is coupled with a gear 36 in mesh with a worm gear 35 mounted to the tuning knob 32a. The worm 35 is coupled with a channel select pointer 37, so the channel select pointer 37 axially moves with rotation of the worm 35. The channel select pointer 37 is seen through a long window 38 formed in the upper surface of the operating board section 1a. The window 38 is formed in such a manner that the upper case 10a is made of transparent resin such as acrylic resin, and print is applied to the entire lower surface thereof excluding the window 38 portion. As shown in FIG. 1, VHF, UHF, FM and AM are printed on both sides of the long window 38. The operating board section 1a further contains a knob 39 for a slide switch serving as a power switch and a select switch for selecting a television mode or a radio mode, a knob 40 for a slide switch for selecting VHF or UHF, and a knob 41 for a slide switch for selecting FM or AM. Openings 39a, 40a and 41a are respectively provided for reception of the knobs 39, 40 and 41. A speaker table 44 with a sound hole 45 is formed by slanting upwardly the front end portion of the bottom surface of the lower case 10b. A speaker 43, made of a piezoelectric buzzer, is mounted to the speaker table 44 with the peripheral portion. The reason why the speaker table 44 is slanted is that the speaker emits sound not only downward but also to the front, thereby to widen the hearing range. The shaft 4 extends under the antenna holder 28 and between the side plate of the lower case 10b and the battery box 23, and passes through holes 46 at both rear ends of the upper case 10a and holes 47 at both ends of the lower case 10b.

Figure 2:
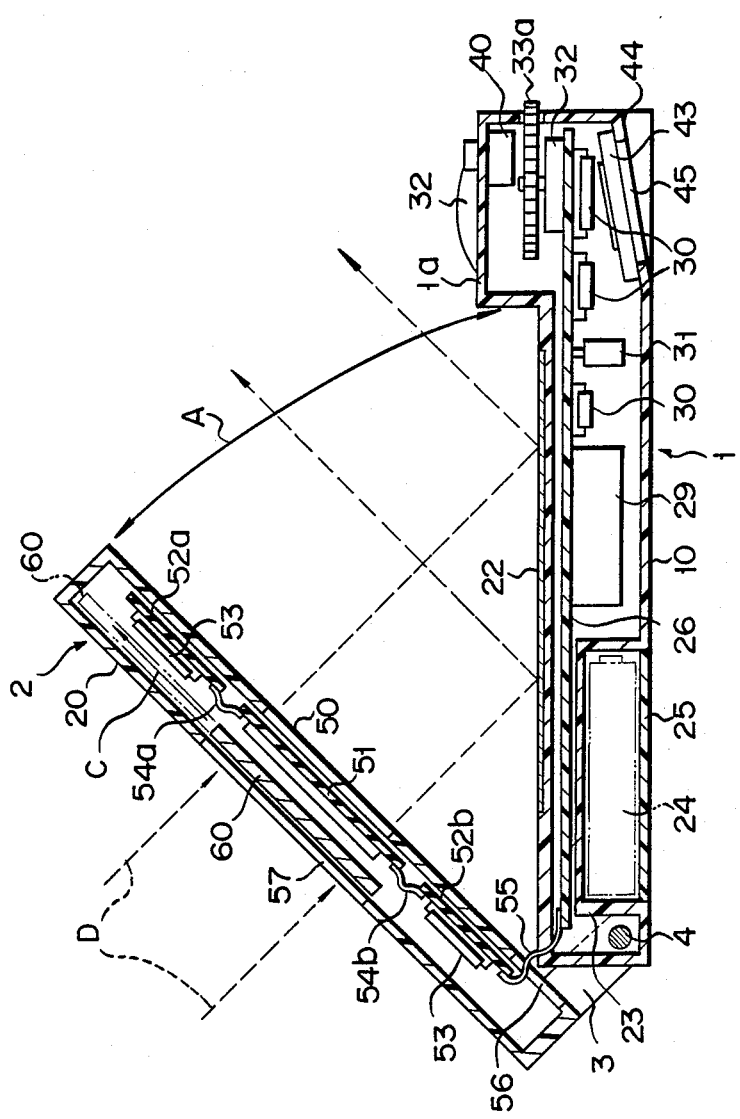
FIG. 2 shows a longitudinal cross sectional view of the TV set shown in FIG. 1.
Figure 7:
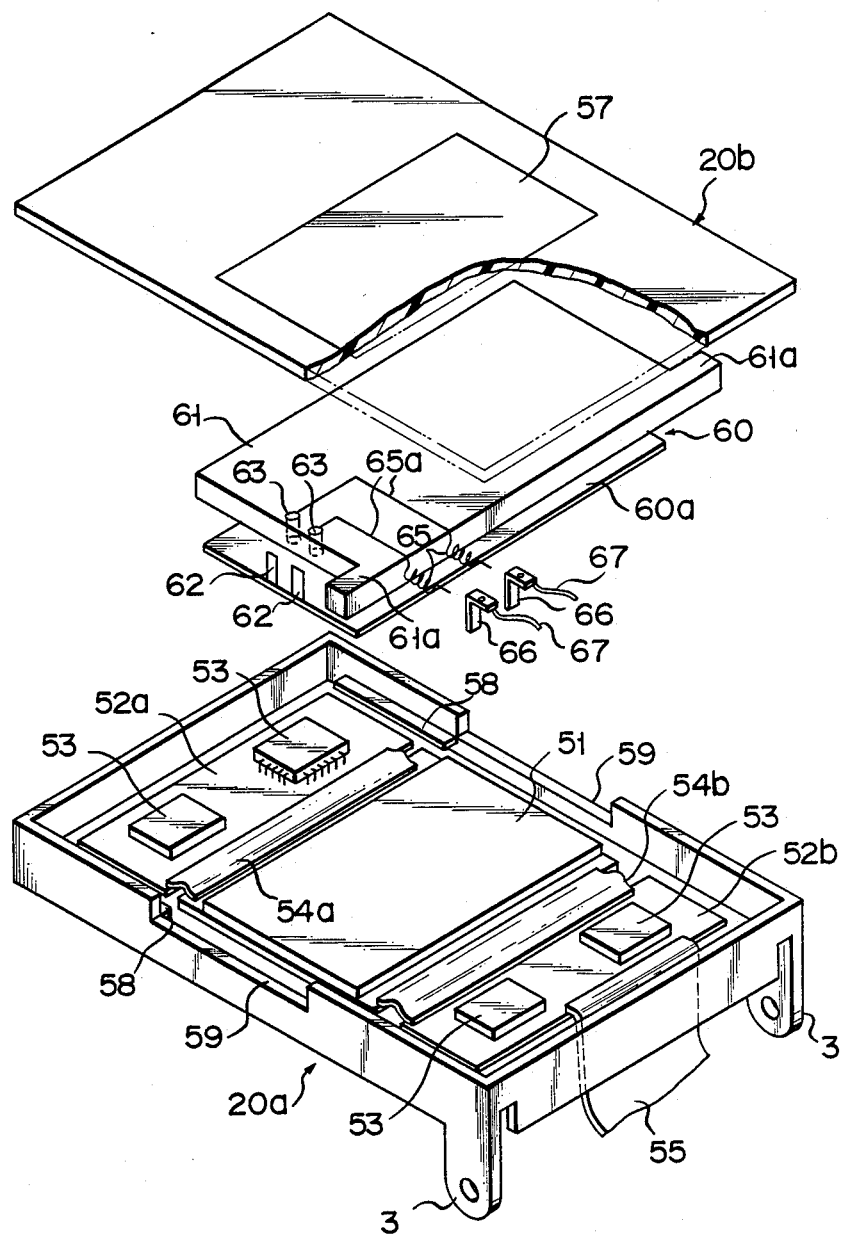
FIG. 7 shows an exploded view of the TV set of FIG. 1 for illustrating a display block thereof.
Figure 8:
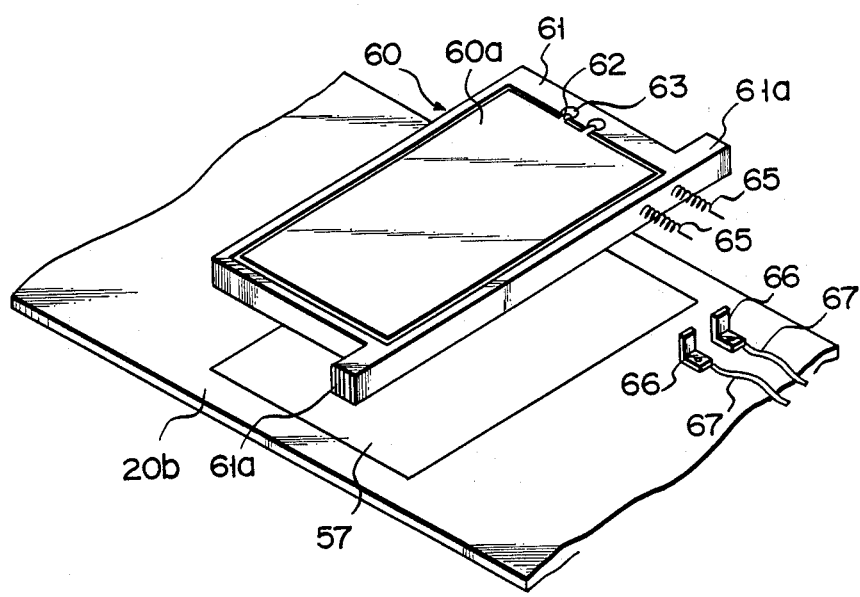
FIG. 8 shows an exploded view of the TV set of FIG. 1 for illustrating an EL panel.

A structure for the hood 2 will be described referring to FIG. 7. FIG. 7 shows the hood 2 in an exploded manner. The hood case 20 is a combination of a case 20a and a panel 20b. The hinges 3 project from both sides of the rear end of the case 20a. A glass 50 for protecting the display panel is mounted to an opening formed in the bottom of the case 20a (FIG. 2). Within the case 10a, a transparent liquid crystal display panel 51 of the dot matrix type is mounted facing the protection glass 50. The liquid crystal display panel 51 is mounted upside down, so a picture imaged on the reflection plate 22 is a noninverted image. Circuit boards 52a and 52b and the liquid crystal display panel 51 are arranged side by side in the case 10a. The circuit boards 52a and 52b each contain, for example, two LSIs 53 for driving the display panel. The circuit boards 52a and 52b are respectively connected, by means of film connectors 54a and 54b, to the terminal arrays on both sides of the liquid crystal display panel 51. Connected to the circuit board 52b is one end of a film flexible connector 55. The connector 55 is led out through an opening 56 of the lower surface of the rear end portion of the hood case 20, is put into the main frame case 10 through an opening 49 formed in the upper surface of the rear end of the main frame case 10, and is connected to the circuit board 26. The board 52a is connected to the board 52b by means of a cable (not shown). The board 52a is connected to the board 26 through the boards 52b and the connector 55. A rectangular opening is formed at a location on the panel 20b facing the liquid crystal display panel 51. A diffusion plate 57 which is a transparent plate (e.g., glass) having a rough surface is mounted to the rectangular opening. An electroluminescence (EL) panel 60 is disposed on the upper side of the liquid crystal display panel 51 in the case 20. The EL panel 60 is formed by gluing an EL panel main body 60a to the lower surface of the base 61, as shown in FIG. 8.

Figure 9:
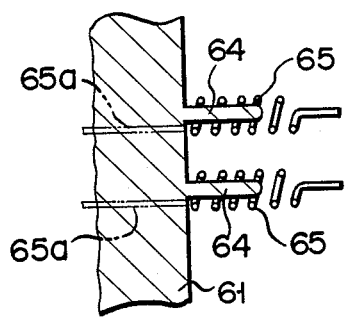
FIG. 9 shows an enlarged view illustrating a contact structure of the EL panel used in the TV set of FIG. 1.

Terminals 62 of the EL panel main body 60a are passed through through-holes 63 of the base 61, and are bent on the upper surface of the base 61. Knobs 61a for sliding the EL panel 60 project outward from both sides of one end of the base 61. Rails 58 are provided at both inner sides of the case 20a. Both sides of the case 20a have cut-away portions 59. Both sides of the base plate 61 are supported slidably between the rails 58 and the lower surface of the upper panel 20b. The knob 61a projects outside through the cut-away portions 59. By operating the knobs 61a, the EL panel 60 is slid from above a portion of the liquid crystal display panel 51 to the front side of the case, thereby to retract from above a portion of the liquid crystal display panel 51. A pair of pins 64 are projected from the end face of the EL panel 60, which is closer to the front side of the hood, as shown in FIG. 9. The pins 64 are provided with contact springs (coiled springs) 65. The end portions of the contact springs 65 are straightened to be used as contacts. The other end portions thereof are used as leads 65a. The leads 65a are led along the upper surface of the base 61 and soldered to terminals 62 of the EL panel main body 60a. In FIGS. 8 and 9, a pair of contact plates 66 are mounted to the lower surface of the upper panel 20b, while respectively facing the contact springs 65 mounted to the EL panel 60. The contact plates 66 are positioned so as to contact with the contact springs 65 when the EL panel 60 is moved to above the liquid crystal panel 51. The contact plates 66 are connected to the circuit board 26 through the circuit board 52b and the flexible connector 55. The EL panel 60 is electrically connected to the circuit board 26 when it is placed above the liquid crystal display panel 51 and automatically turns on to emit light.

Figure 10:
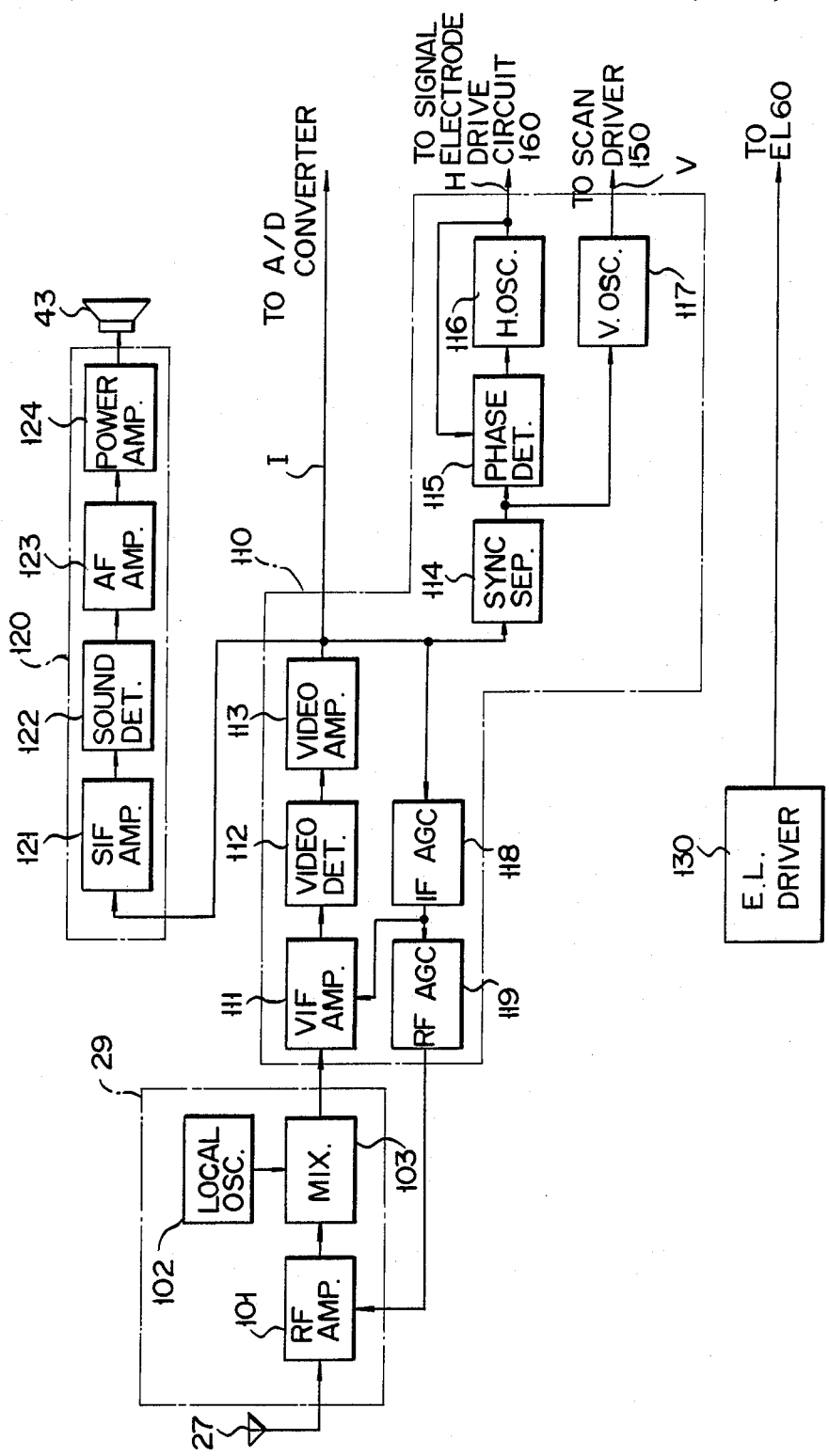
FIG. 10 shows a block diagram of a circuitry formed in the main frame of the TV set of FIG. 1.
Figure 11:
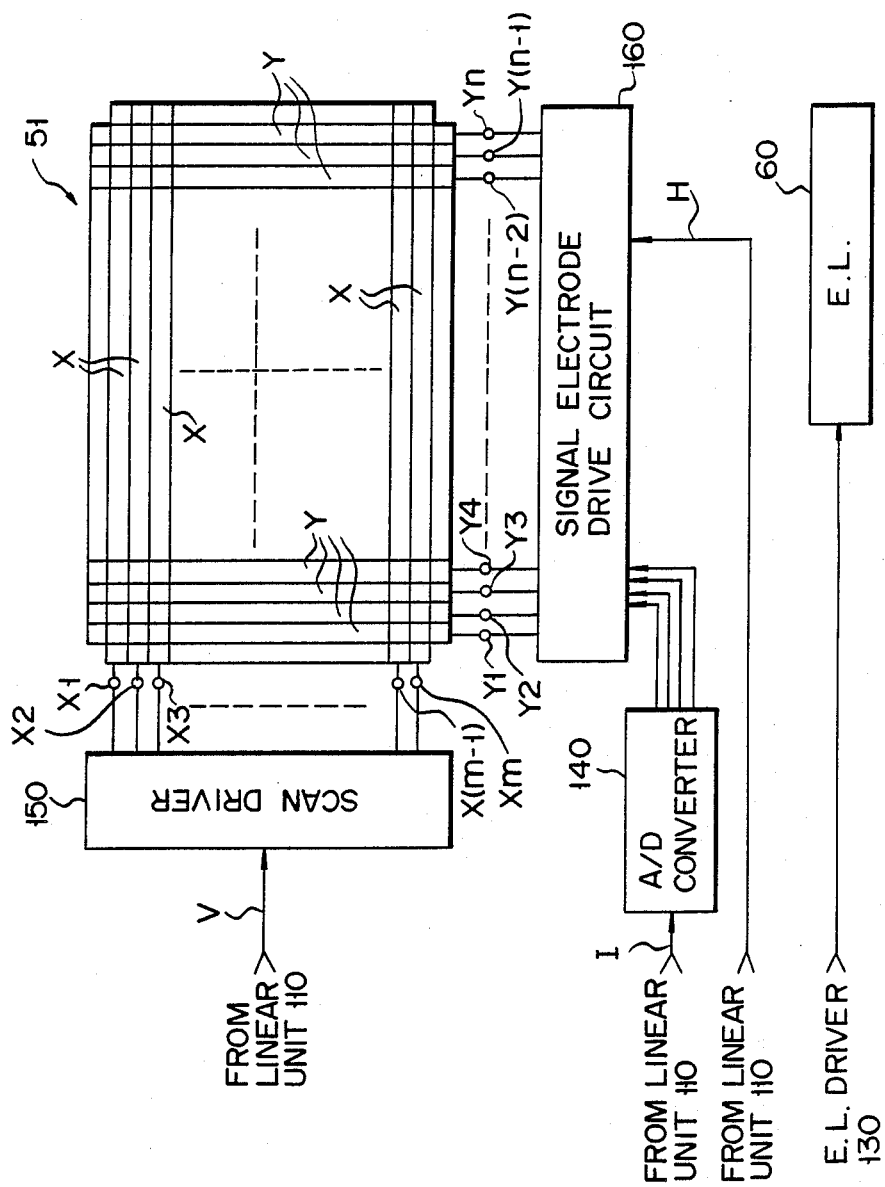
FIG. 11 shows a block diagram of a circuitry formed in the display block of the TV set in FIG. 1.

A circuit arrangement of the TV set which is an embodiment of the present invention will be described referring to FIGS. 10 and 11. The circuit board 26 contains the above mentioned tuner 29, a linear unit 110, an audio amplifier circuit 120 and an EL panel drive circuit 130. Those circuits are each structured with the LSIs 30 and the transistor 31 and so on. The circuit boards 52a and 52b of the hood 2 contain an A/D converter 140, a scanning drive circuit 150, and a signal electrode drive circuit 160, as shown in FIG. 11. These circuits are formed in the LSIs 53. As already mentioned, those circuits are interconnected by the flexible connectors 54a, 54b, and 55. As described above, the A/D converter 140, the scanning electrode drive circuit 150, and the signal electrode drive circuit 160 are provided in the hood 2. The reason for this is that the number of lines in the flexible connector 55 may be decreased, and the connection thereof is easy.

The detailed circuit arrangements of the respective circuits will be given. The tuner 29 will first be described. A high frequency signal picked up by the antenna 27 enters a radio frequency amplifier 101. The amplifier 101 amplifies the received signal and outputs the amplified one. A local oscillator 102 produces an oscillating signal. The output signals from the amplifier 101 and the oscillator 102 are input to a mixer 103. The mixer 103 mixes the input signals to form an intermediate frequency signal.

In the linear unit 110, a video intermediate frequency amplifier 111 receives the output signal from the mixer 103 and amplifies it, and then outputs the amplified one to a video detector 112. The video detector 112 detects the input signal and outputs the detected one to an video amplifier 113. The video amplifier 113 amplifies the input signal and produces it as a video signal I. A sync separation circuit 114 separates a sync signal component from the video signal I and produces it as a sync signal. A phase detector 115 detects a phase difference between a horizontal sync component of the sync signal and a horizontal sync signal H to be given later, and controls a horizontal sync oscillator 116. The horizontal sync oscillator 116 produces a horizontal sync signal H exactly synchronized with the horizontal sync component of the sync signal. The phase detector 117 and the horizontal sync oscillator 116 make up an automatic frequency control circuit (AFC). A vertical sync oscillator 117 produces a vertical sync signal V synchronized with a vertical sync signal component of the sync signal produced by the sync separation circuit 114. An intermediate frequency automatic gain control circuit 118 receives the video signal I, and controls the video intermediate frequency amplifier 111 by using the video signal I, so the output signal from the intermediate frequency amplifier 111 is kept at a fixed level. The radio frequency automatic control circuit 119 controls the radio frequency amplifier 101 by using the output signal from the intermediate frequency automatic gain control circuit 118, so the output signal from the amplifier 101 is kept at a fixed level.

An arrangement of the audio amplifier circuit 120 follows. An audio intermediate frequency amplifier 121 amplifies the video signal and applies it to a sound detector 122. The sound detector 122 detects the input signal and produces a sound signal. The sound signal is amplified by an audio amplifier 123 and a power amplifier 24, and supplies the amplified one to the speaker 43. The EL panel drive circuit 130, connected to the EL panel 60, drives the EL panel 60. When supplied with DC power source, the drive circuit 130 drives the EL panel in an AC mode in synchronism with clock pulses. As described above, when the EL panel 60 is located above the liquid crystal panel 51, the EL panel 60 is activated to emit light.

The A/D converter 140 receives the video signal I and samples and converts it into a digital signal of 4 bits, for example. As shown in FIG. 11, the liquid crystal panel 60 has m scanning electrodes X arrayed in parallel on one of the panel surfaces. On the other hand, n signal electrodes Y are arrayed in parallel on the other panel surface. The electrodes X and Y respectively have terminals X1 to Xm and Y1 to Yn. The scanning electrode drive circuit 150 responds to the vertical sync signal V from the linear unit 110 and sequentially drives the scanning electrodes X1 to Xm. The signal electrode drive circuit 160 responds to the horizontal sync signal H to sequentially drive the signal electrodes Y1 to Yn. The signal electrode drive circuit 160 supplies one of 16 ($2^4$) levels of voltages which is corresponds to the output signal from the A/D converter 140 to that one of the signal electrodes Y1 to Yn which is specified by the horizontal sync signal H, thereby to provide a tone of the screen of the liquid crystal display panel 51. By operating the tuning dial 32, the oscillating frequency of the local oscillator 102 is changed, so a desired radio wave can be selected. Further, by operating the bright volume dial 34, brightness on the screen of the liquid crystal display panel 51 can be adjusted.

The liquid crystal TV set thus arranged is used in a state that the hood 2 is opened at a predetermined angle, as shown in FIGS. 1 and 2. A picture reproduced on the liquid crystal display panel 51 is projected onto the reflection plate 22, as indicated by a broken line E of FIG. 1. In a place where a sufficient amount of external light is obtained, the EL panel is retracted from above the liquid crystal display panel 51, as indicated by a broken line C in FIG. 2, and the light passed through the diffusion plate 57 is used for displaying a picture. In a place where an insufficient amount of external light is obtained, the EL panel is set above the liquid crystal display panel 51 and the light emitted from the EL panel 60 is used for providing the display of a picture.

As described above, in the TV set according to the present invention, in a place where an insufficient amount of light is obtained, the EL panel 60 is placed to face the liquid crystal display panel 51. The light emitted from the EL panel 60 is therefore used for providing the display of a picture. In a place where a sufficient amount of external light is obtained, the EL panel is retracted from the liquid crystal display panel 51 and the external light is used for the picture display. Thus, the TV set according to the present invention can display a picture in any place, dark and bright. Additionally, in a bright place, the EL panel 60 is not used and, therefore, the drive power for the EL panel can be saved. Since the EL panel uniformly illuminates the liquid crystal display panel 51, the reproduced picture is free from irregularity. Further, the contrast of the reproduced picture is satisfactory. Therefore, the liquid crystal type TV set according to the present invention is capable of providing a reproduced picture which has bright, uniform brightness and good contrast.

Figure 12:
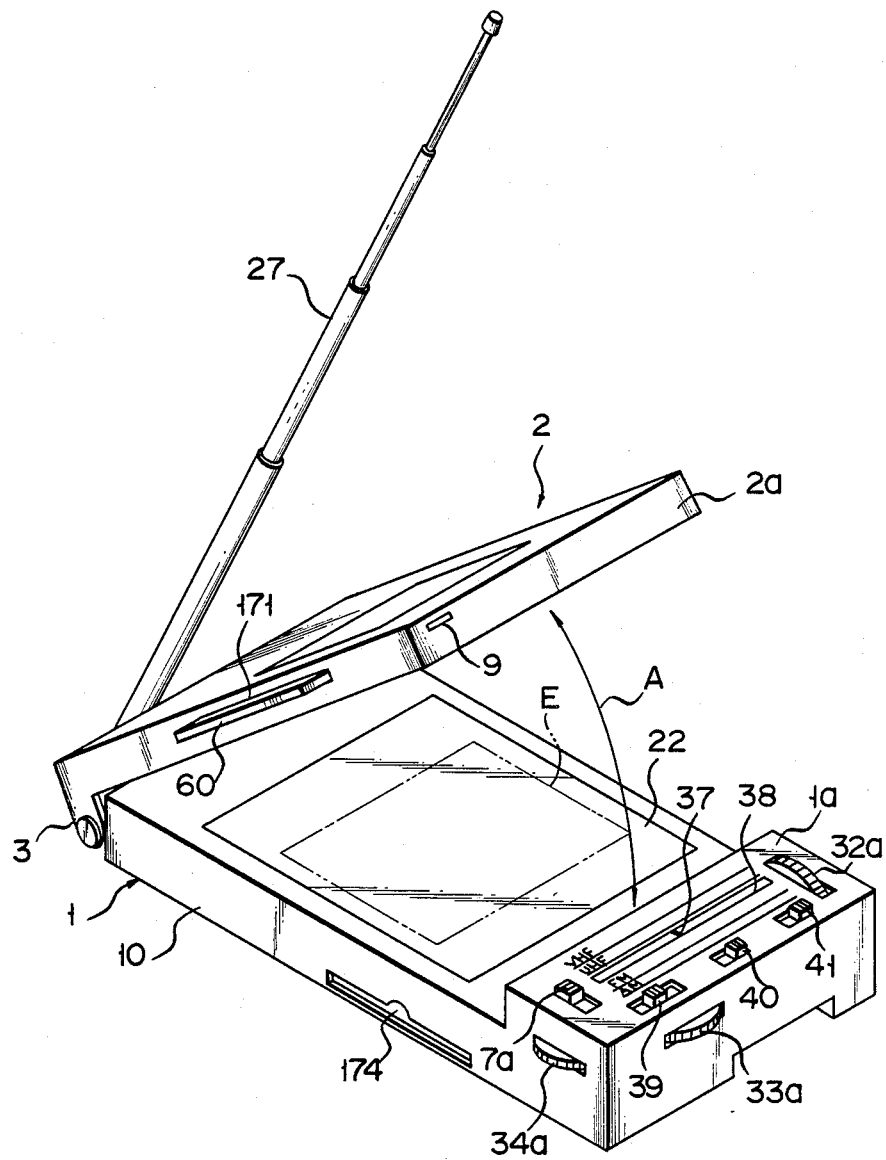
FIGS. 12 to 14 are views for illustrating a structure of a liquid crystal TV set which is a second embodiment of the present invention.
Figure 13:
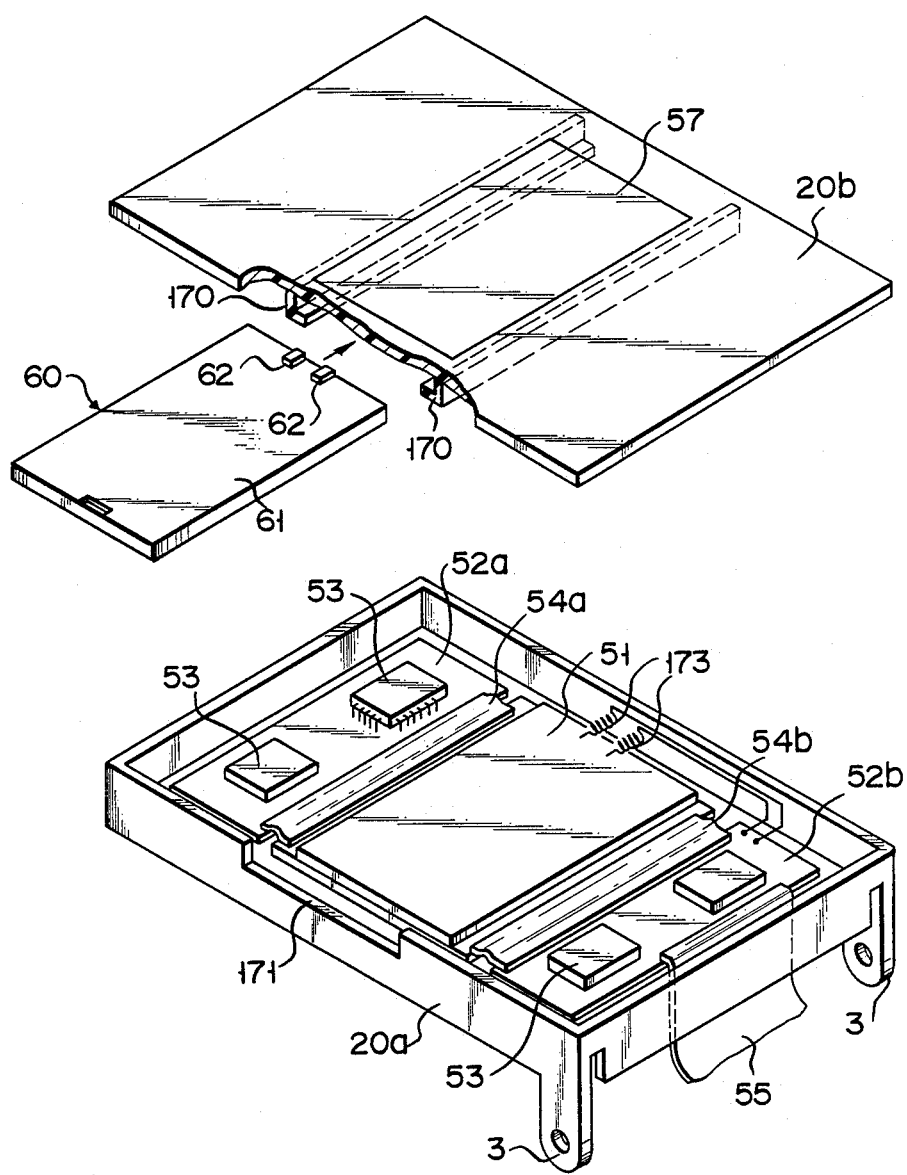
Figure 14:
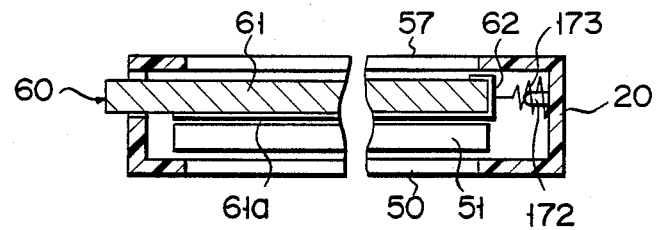

In the above-mentioned embodiment, the El panel 60 is slidably set in the hood 2. This arrangement may be modified such that the El panel 60 is set to the hood 2, as illustrated in FIGS. 12 to 14. Like reference symbols are used to designate like or equivalent portions in FIGS. 1 to 9. This modification will be discussed in detail. As shown in FIG. 13, a pair of rails 170 for guiding and supporting the EL panel are provided on the lower surface of the panel 20b of the hood case 20. The El panel 60 is inserted between the pair of rails 170, through an opening 171. A pair of pins 172 are formed on the inner side wall of the hood case 20 (FIG. 14). Contact springs 173 are set to the pins 172. A pair of electrodes 62 of an EL panel body 60a are bent along the end face of the base 61. The electrode terminals 62 and the contact springs 173 contact with each other when the EL panel 60 is inserted between the rail pair 170. Accordingly, when the EL panel 60 is inserted into the hood 2, electric power is automatically supplied to the EL panel 60, which emits light. Also in this case, a lock mechanism (not shown) locks the EL panel 60, so the panel does not slip out. When the EL panel 60 is not used, it is inserted through an opening 174 into the main frame 1 for storage therein. When the panel is stored therein, it is also locked by means of a lock mechanism (not shown).

Figure 15:
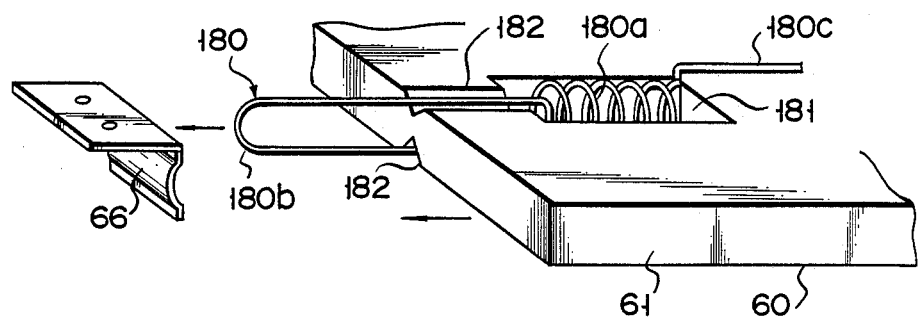
FIGS. 15 and 16 are views for illustrating a structure of a third embodiment of a liquid crystal display device according to the present invention.
Figure 16:
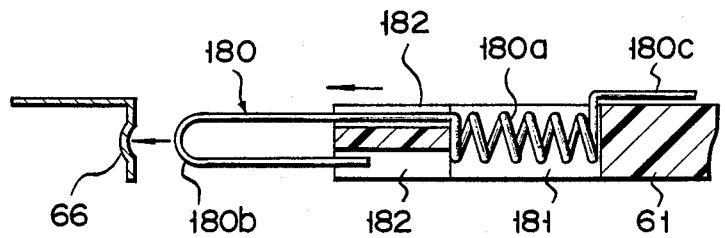

In the above-mentioned embodiments, the ends of the springs 65 and 173 are elongated and used as the contacts. Alternatively, a contact spring 180 as shown in FIG. 15 or 16 may be used. As shown, the spring 180 is comprised of a coiled spring section 180a, a U-shaped contact section 180b extended from the spring section 180a and a lead section 180c extended from the other end of the spring section 180c. The spring section 180a is located in a rectangular hole 181 closer to the end of the base plate 61. The contact section 180b is fit in grooves 182 in the upper and lower surfaces of the base 61. The end of the lead section 180c is soldered to the electrode terminals (not shown) of the EL panel body 60a. When the El panel 60 is set above the liquid crystal panel 51, the U-shaped contact sections 180b is in contact with the contact plate 66. It is evident that the contact spring 180 may be mounted to the case 20 of the hood. In this case, the member for supporting the contact spring 180 and guides for guiding the straight portions of the contact sections 180b are provided in the case 20. Further, a contact plate 66 is provided on the EL panel 60.

Figure 17:
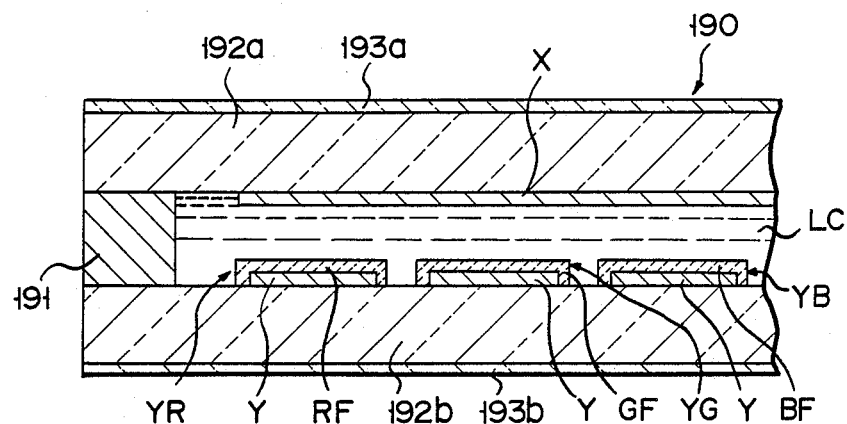
FIGS. 17 to 19 show views for illustrating a structure of a fourth embodiment of a liquid crystal TV set according to the present invention.
Figure 18:
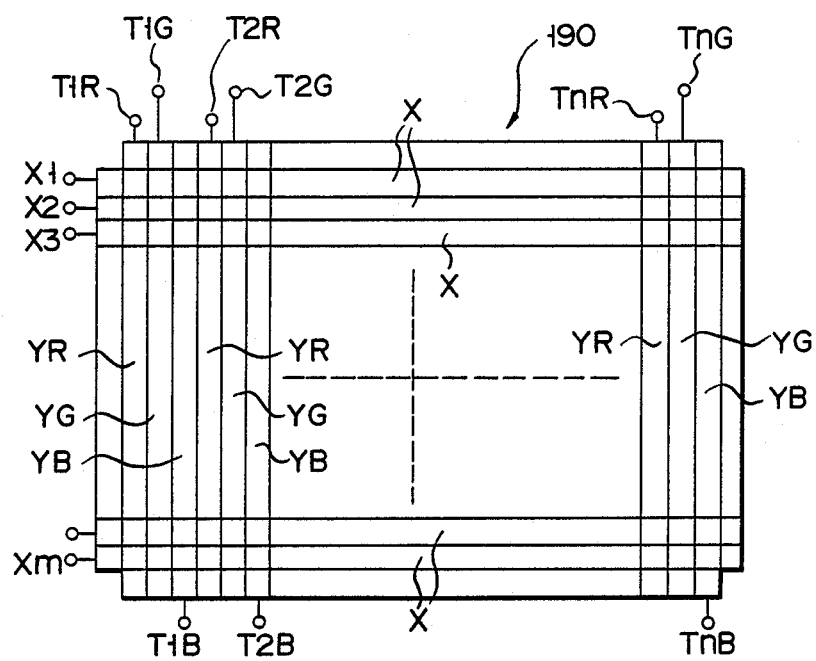

While the above-mentioned embodiment relates to the TV set of the dot matrix type, the present invention is applicable for another type of TV set, for example, a TV set of the color dot matrix type. FIGS. 17 and 18 structurally and schematically illustrate a liquid crystal display panel 190 of the dot matrix type for effecting a color display by using primary colors filters. The liquid crystal panel 190 is of the TN (twisted nematic) type. A pair of upper and lower transparent substrates 192a and 192b are glued to each other with a sealing member 191 therebetween and a space formed therebetween. The space is filled with nematic liquid crystal LC. Deflection plates 193a and 193b are glued to the outer surfaces of the substrates 192a and 192b, respectively. One of the substrates 192a and 192b, the substrate 192a, for example, has transparent scanning electrodes X arranged in parallel on the inner surface. Formed on the inner surface of the other substrate 192b are a red signal electrode YR having a red filter RF formed on the surface of a transparent signal electrode Y, a green signal electrode YG having a green filter GF formed on a transparent signal electrode Y, and a blue signal electrode YB having a blue filter BF formed on the surface of a transparent signal electrode Y. These electrodes YR, YG and YB are alternately arranged orthogonal to the scanning electrodes X. The scanning electrodes X are connected to terminals X1 to Xm, respectively. Similarly, the electrodes YR are connected to electrodes T1R to TnR; the electrodes YG, to electrodes T1G to TnG; the electrodes YB, to electrodes T1B to TnB.

Figure 19:
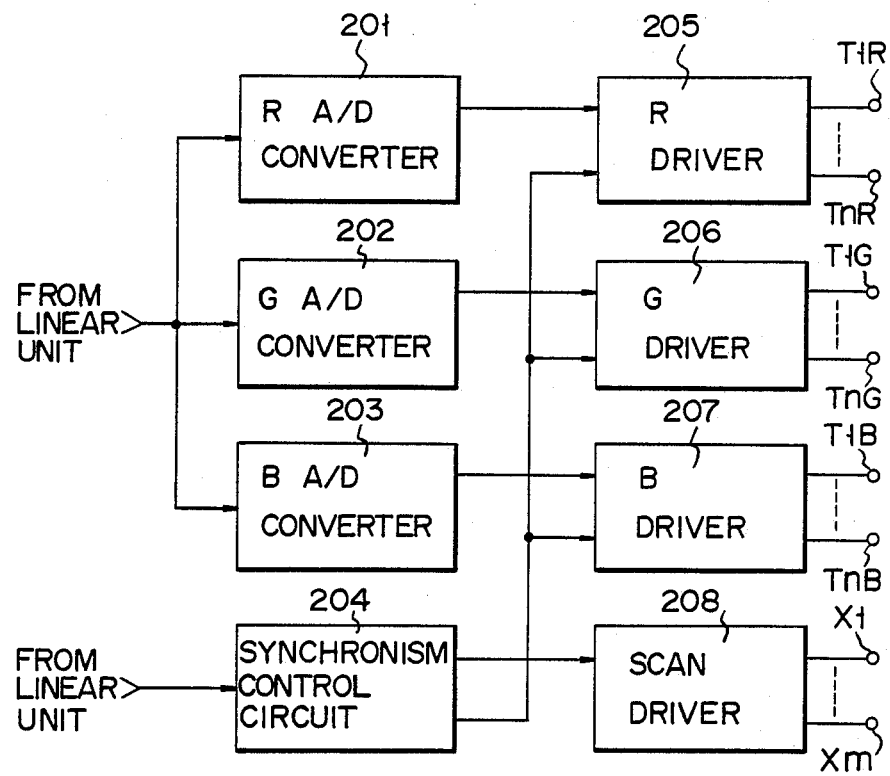

An arrangement of the circuit for driving the color liquid crystal panel 190 will be described referring to FIG. 19. A video signal from a liner unit for a color TV set (not shown) is input to a red A/D converter 201, a green signal A/D converter 202, and a blue signal A/D converter 203. The red A/D converter 201 converts a red signal component of the video signal into a digital signal. The green signal A/D converter 201 converts a green signal component into a digital signal. The blue signal A/D converter 202 converts a blue signal component into a digital signal. A sync signal from the linear unit for color TV set is input to a sync control circuit 204. In response to the sync signal, the sync control circuit 204 produces color signal signals for transmission to a red signal electrode drive circuit 205, a green signal electrode drive circuit 206 and a blue signal electrode drive circuit 207. In response to the sync signal, the sync control circuit 204 produces a vertical sync signal to a scanning drive circuit 208. At the timing of the color sync signal, the red signal electrode drive circuit 205 produces a drive signal of the voltage corresponding in the output signal from the red signal A/D converter 201 and applies it to the terminals T1R to TnR, thereby to drive the red signal electrodes YR. In response to the color sync signal and the output signal from the green signal A/D converter 202, the green signal electrode drive circuit 206 drives the green signal electrodes YG. Similarly, the blue signal electrode drive circuit 207 responds to the color sync signal and the output signal from the blue signal A/C converter 203, and drives the blue electrodes YB. The scanning drive circuit 208 responds to a vertical sync signal from the sync control circuit 204 to apply a drive signal to the scanning electrode terminals X1 to Xn, and drives the scanning electrodes X. The color TV set with such an arrangement provides a high quality color picture with a uniform brightness and a high contrast.

While the above-mentioned embodiments employ liquid crystal panels 51 and 190 of the simple matrix type, the liquid crystal display panel may be of the double matrix display type.

Further, the circuit for driving the liquid crystal panel, which is provided in the hood 2 in the above mentioned embodiments, may be provided in the main frame 1. Moreover, all the parts in the main frame 1 may be placed in the display block 2. In this case, the main frame 1 is a simple base plate, and the reflecting plate 22 is mounted on the upper surface thereof.

What is claimed is:
1. A liquid crystal television receiver comprising:
a reflecting member for reflecting light applied thereto;
a hood member for covering an upper portion of said reflecting member;
a transparent liquid crystal display which is provided in said hood member, said display panel being movable and slantable with respect to said reflecting member and projecting an image on said reflecting member;
receiving means for receiving television signals;
drive means, which is connected to said receiving means, for driving said transparent liquid crystal display panel in response to a signal from said receiving means;
an illuminating member for illuminating said liquid crystal display panel; and
holding means provided in said hood member for selectively holding said illuminating member at a predetermined location adjacent a surface of said liquid crystal display panel so as to light said liquid crystal display panel.

2. The liquid crystal television receiver according to claim 1, in which said transparent liquid crystal display panel is a transparent liquid crystal display panel of the color dot matrix type for displaying a color picture through primary color filters.

3. The liquid crystal television receiver according to claim 1, in which said hood member is rectangular in shape, and
said holding means has guide rails provided on inner surfaces of two opposite side walls of said hood member, whereby said illuminating member may retract from said predetermined location to another location.

4. The liquid crystal television receiver according to claim 3, in which said guide holding means has guide grooves formed in the two opposite side walls of said hood member, and said illuminating member has knobs projecting outward through said grooves.

5. The liquid crystal television receiver according to claim 1, in which said holding means has an opening formed in a side wall of said hood member, and guide rails are provided on the an upper plate of said hood member for guiding said illuminating member inserted through said opening to the predetermined location.

6. The liquid crystal television receiver according to claim 1, in which said liquid crystal display panel is disposed such that said reflecting member provides a non-inverted image.

7. The liquid crystal television receiver according to claim 1, further comprising a supporting shaft for supporting said hood member and said reflecting member so that said hood and reflecting members are rotatably coupled with each other.

8. The liquid crystal television receiver according to claim 7, further comprising means for automatically rotating said hood member relative to said reflecting member about said supporting shaft at a predetermined angle, to thereby move said members from their closed position to the opened position.

9. The liquid crystal television receiver according to claim 7, further comprising:
means for automatically rotating said hood member relative to said reflecting member about said supporting shaft at a predetermined angle, to thereby move said members from their closed position to the opened position; and
braking means for controlling the rotation speed of said hood member so as to prevent said hood member from rapidly rotating.

10. The liquid crystal television receiver according to claim 1, in which said reflecting member includes said receiving means, and said hood member includes said drive means.

11. The liquid crystal television receiver according to claim 1, in which said reflecting member includes a base and a surface coated mirror mounted to said base.

12. The liquid crystal television receiver according to claim 1, further comprising:
second drive means provided in said reflecting member, for driving said illuminating member;
a first electrode section provided in said hood member and connected to said second drive means; and a second electrode section, mounted to said illuminating member so as to contact said first electrode section when said illuminating member is located at the predetermined location, for transferring, at this time, electric power to said illuminating member.

13. The liquid crystal television receiver according to claim 1, in which said transparent liquid crystal display panel is a dot matrix type display panel.

14. The liquid crystal television receiver according to claim 1, wherein said illuminating member is a substantially planar illuminating member.

15. The liquid crystal television receiver according to claim 14, wherein said planar illuminating member comprises an electroluminescence panel.

16. The liquid crystal television receiver according to claim 1, wherein said illuminating member comprises an electroluminescence panel.

17. The liquid crystal television receiver according to claim 1, wherein said holding means holds said illuminating member at a predetermined location adjacent a surface of said liquid crystal display panel which is opposite to that surface of said liquid crystal display panel facing said reflecting member.

18. An improved lighting device for an electronic device having a body comprising a case provided with an electric circuit therein, a liquid crystal display panel provided on the case and a mirror for watching an image on the liquid crystal display panel by the light passing through the display panel, wherein the improvement comprising:
   an electroluminescence device detachably provided in the case;
   first means for supplying a current from the electric circuit to the electroluminescence device;
   second means for positioning the electroluminescence device at a position adjacent the liquid crystal display panel so as to light the panel said liquid crystal display panel being hinged on the case at one end thereof and held in a slanted position.

19. The lighting device according to claim 18, further comprising third means for receiving the electroluminescence device in the case.

20. The lighting device according to claim 19, wherein the electroluminescence device is attached to the upper surface of the liquid crystal display panel.

21. The lighting device according to claim 19, wherein the electroluminescence device is positioned in a position adjacent the underside of the liquid crystal display panel disposed in the horizontal position.

22. An electronic device having an improved lighting device, said device comprising:
   a first member containing receiving means for receiving a radio wave and outputting signals corresponding to the received wave, and having reflecting means provided on a surface of the first member;
   a second member having a liquid crystal (LC) display panel member thereon, driving means for receiving the output signal of said receiving means and for driving said LC panel member, said second member being hingedly connected to said first member, and said second member holding said LC panel member so that said LC panel member is inclined to said reflecting means) for projecting a view image onto said reflecting means; and
   an illuminating member detachably coupled to said second member for illuminating said LC panel member and for covering one surface of said LC panel member when said illuminating member is coupled to said second member.

23. An electronic device having an improved lighting device, said device comprising:
   a first member containing receiving means for receiving a radio wave and outputting signals corresponding to the received wave, and having reflecting means provided on a surface of the first member;
   a second member having a liquid crystal (LC) display panel member, driving means for receiving the output signal of said receiving means and for driving said LC panel member, said second member being hingedly connected to said first member so as to be inclined at an angle to said first member for projecting a display image generated by said LC display panel member onto said reflecting means; and
   an illuminating member detachably coupled to said second member, said illuminating member when coupled to said second member being held on one surface of said LC panel member for illuminating said LC panel member and being removable from said second member when an external light is used to illuminate said LC panel member.

* * * * *

UNITED STATES PATENT AND TRADEMARK OFFICE
CERTIFICATE OF CORRECTION

PATENT NO.  : 4,809,078
DATED       : February 28, 1989
INVENTOR(S) : YATE et al It is certified that error appears in the above-identified patent and that said Letters Patent is hereby corrected as shown below:

TITLE PAGE:

Section [21] - Change the application serial number
    "555,509" to read --655,509--.

Section [30] Foreign Application Priority Data -
    Following Japanese application No. "58-184865",
    insert --[U]--.

Section [56] References Cited - under "FOREIGN PATENT
    DOCUMENTS, insert the following:

--54-52415    4/1979   Japan--
    --59-176771  10/1984   Japan--.

Signed and Sealed this

Fourth Day of May, 1993

Attest:

MICHAEL K. KIRK

Attesting Officer

Acting Commissioner of Patents and Trademarks